United States Patent [19]

Hart et al.

[11] Patent Number: 5,114,260
[45] Date of Patent: May 19, 1992

[54] CLEVIS AND SCREW PIN TYPE SHACKLE WITH PIN LOCK

[76] Inventors: Judy L. Hart, 2322 - 37th S.W., Seattle. Wash. 98128; William A. Munday, P.O. Box 15611, Seattle, Wash. 98115

[21] Appl. No.: 699,451

[22] Filed: May 13, 1991

[51] Int. Cl.⁵ .................................................. F16D 1/00
[52] U.S. Cl. ........................................ 403/24; 403/154; 59/86
[58] Field of Search ......................... 403/154, 156, 24; 59/86; 411/145, 146, 141, 949

[56] References Cited

U.S. PATENT DOCUMENTS

| | | |
|---|---|---|
| 270,372 | 1/1883 | Beeman . |
| 285,962 | 10/1883 | Bracken . |
| 355,980 | 1/1887 | Dimon ................... 59/86 |
| 453,222 | 6/1891 | Unckrich . |
| 612,046 | 10/1898 | Mathews et al. . |
| 615,367 | 12/1898 | Sattes . |
| 618,086 | 1/1899 | Haase . |
| 727,716 | 5/1903 | Uren . |
| 809,511 | 1/1906 | Lien . |
| 1,002,120 | 8/1911 | Berner . |
| 1,419,974 | 6/1922 | McLaughlin . |
| 1,646,546 | 10/1927 | Larsen . |
| 2,097,465 | 11/1937 | Morrison ................ 59/86 |
| 2,124,912 | 7/1938 | Ehmann ................. 59/86 |
| 3,754,418 | 8/1973 | Miller .................... 70/18 |
| 4,102,124 | 7/1978 | Swager .................. 59/86 |
| 4,423,610 | 1/1984 | Hart et al. .............. 70/18 |

FOREIGN PATENT DOCUMENTS

| | | |
|---|---|---|
| 572165 | 6/1924 | France ................... 411/141 |
| 13369 | 5/1910 | United Kingdom ..... 411/141 |
| 2080478 | 2/1982 | United Kingdom ..... 59/86 |

Primary Examiner—Andrew V. Kundrat
Attorney, Agent, or Firm—Delbert J. Barnard

[57] ABSTRACT

A closure pin extends through aligned openings in first and second spaced apart eyes at the open end of a substantially U-shaped clevis. One end of the closure pin is threaded and mates with threads in the opening in the second eye. The closure pin includes a head portion and a radial flange at its opposite end, and it carries a releasable lock member. The releasable lock member includes a pair of detents which are positioned in radial slots in the flange. A spring biases the lock member into a position in which the detents extend axially beyond the radial flange towards the threaded end of the pin. A plurality of lock ramps are provided on the outer face of the first eye. The ramps are spaced circumferentially apart. Each ramp includes a first end which is substantially flush with the outer face, a second end spaced circumferentially from the first end and axially outwardly from said face, and inclined surface extending from the first end to the second end, and a second surface at the second end extending out from said outer face. As the closure pin is rotated to connect it to the clevis, the detents contact and move up the inclined surfaces of the ramps and by such contact are moved against the force of biasing spring into the slots, allowing the closure pin to be rotated. When the closure pin is connected to the clevis, an unwanted reverse rotation of the closure pin is blocked by contact between the detents and the end surfaces of the ramps. The closure pin can be easily disconnected from the clevis by a user retracting the lock member, to retract the detents into the slots of the annular flange, while at the same time rotating the closure pin in a reverse direction.

15 Claims, 2 Drawing Sheets

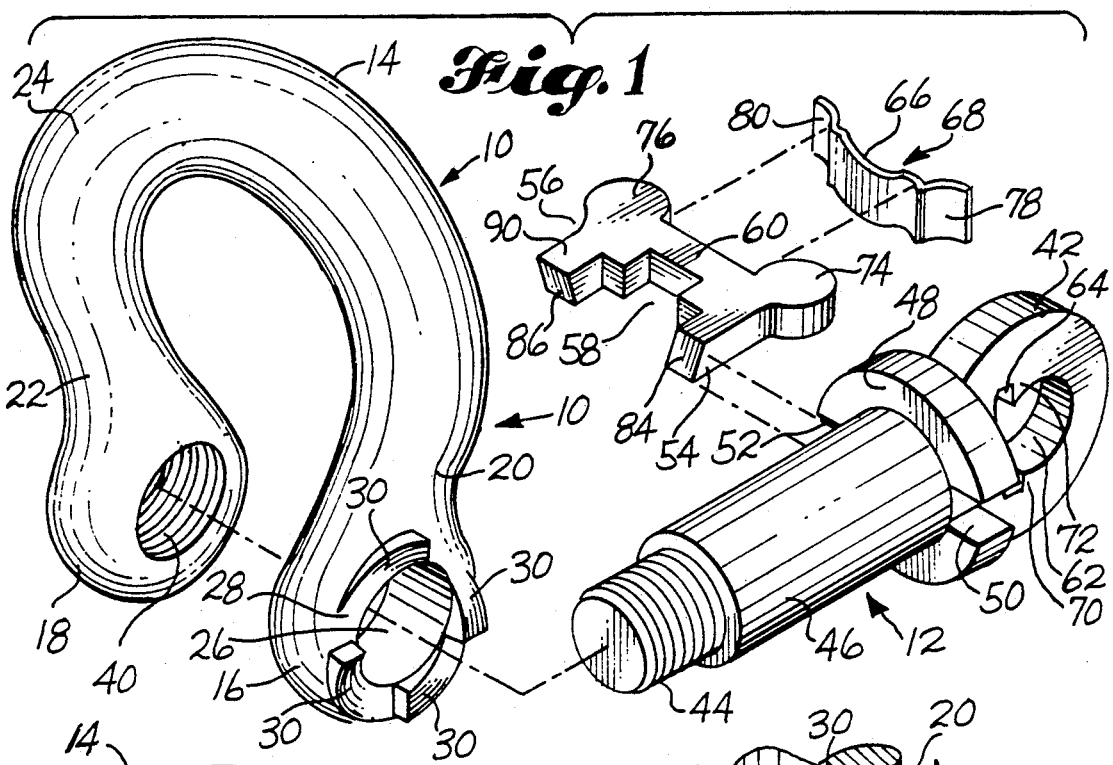
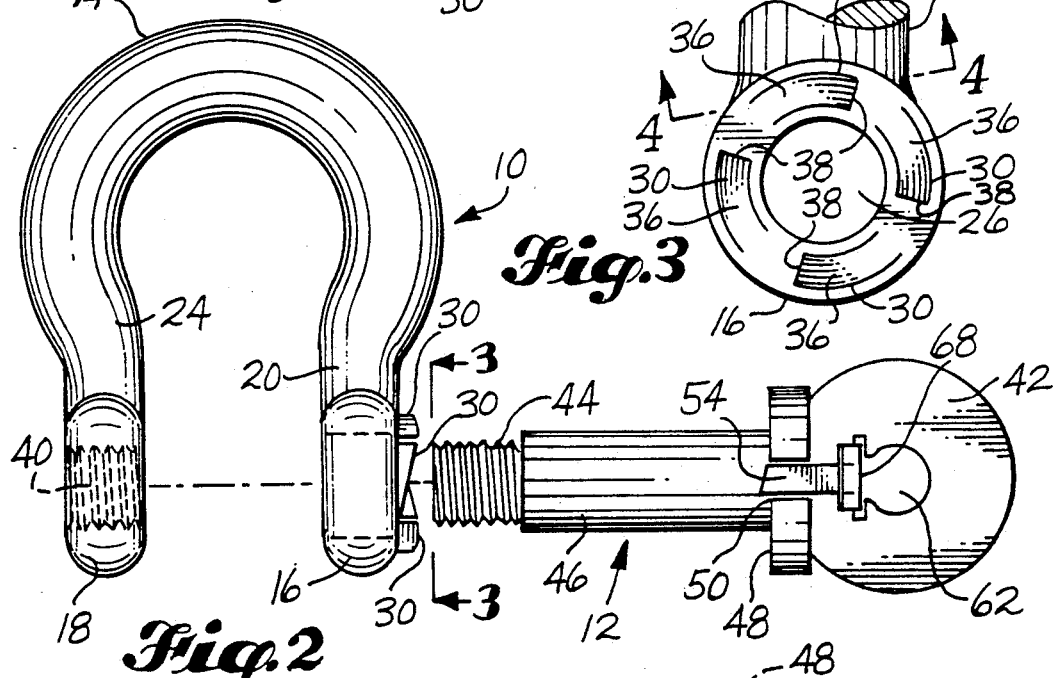

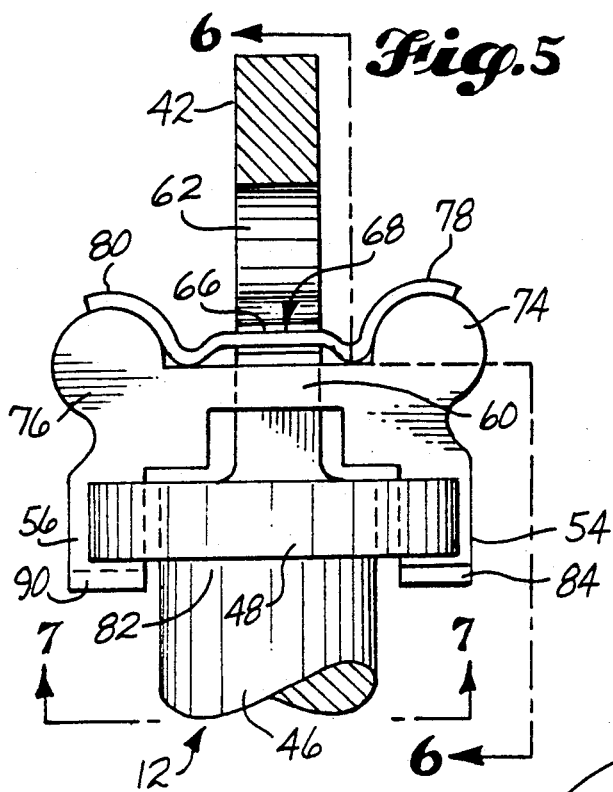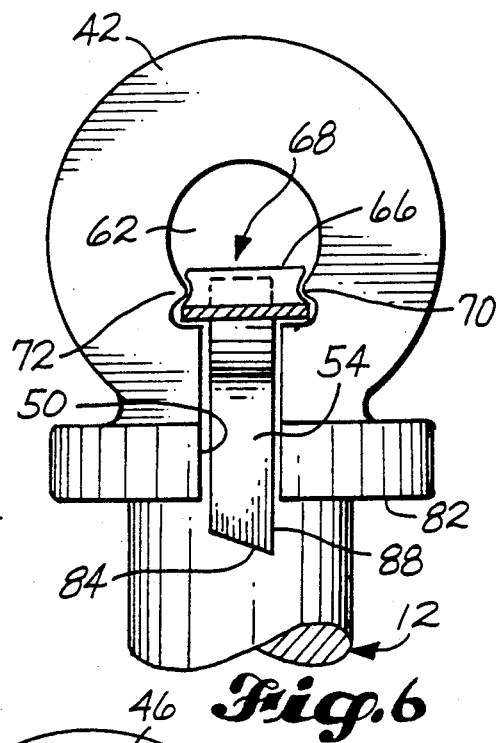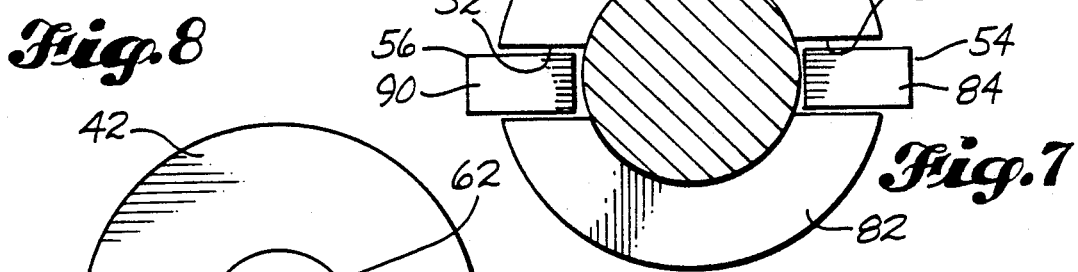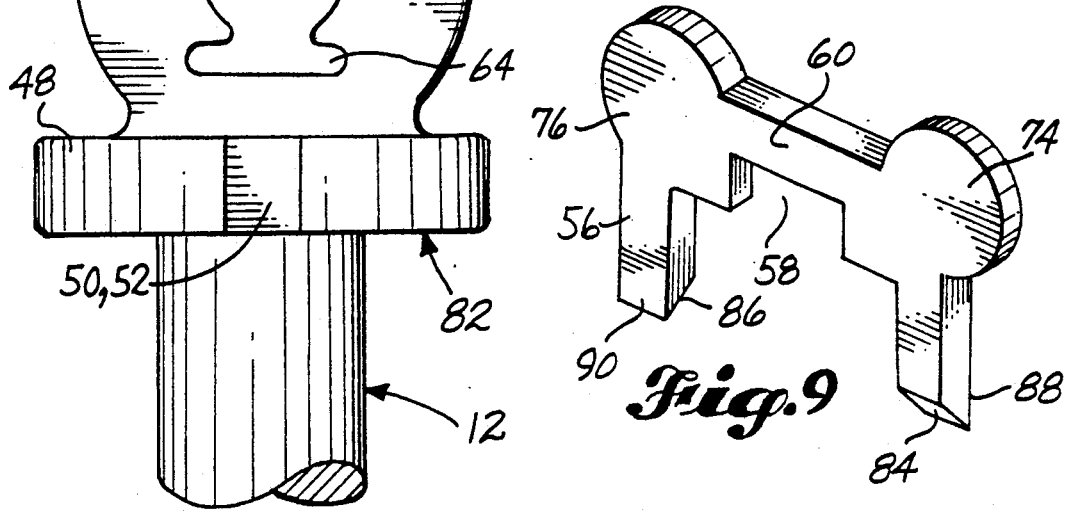

CLEVIS AND SCREW PIN TYPE SHACKLE WITH PIN LOCK

TECHNICAL FIELD

This invention relates to shackles of a type composed of a substantially U-shaped clevis that is closed by a closure pin which extends through aligned openings in eyes which define an open end of the clevis, and which includes threads which mate with threads in one of the openings More particularly, it relates to the provision of a simple but effective lock mechanism for such type of shackle which prevents unwanted reverse rotation of the closure pin in response to vibration or other forces acting on the shackle.

BACKGROUND INFORMATION

Pin and clevis type shackles which include a lock for preventing unwanted disengagement of the pin from the clevis are disclosed by the following U.S. Pat. Nos. 2,097,465, granted Nov. 2, 1937, to William D. Morrison; 3,754,418, granted Aug. 28, 1973, to Peter B. Miller; and 4,423,610, granted Jan. 3, 1984, to Judy L. Hart and William A. Munday. The latter patent discusses how a closure pin that is merely screw connected to the clevis can become disconnected from the clevis when subjected to vibration and other forces imposed upon it when in use. A principal object of the present invention is to provide an improved shackle clevis and pin shackle having a pin lock mechanism which is a part of the pin and the clevis, so as to add no additional separable part to the shackle mechanism.

DISCLOSURE OF THE INVENTION

The shackle of the present invention includes a U-shaped clevis having a closed end and an open end. A pair of spaced apart eyes at the open end define a throat between them. One of the eyes includes a first opening, an outer face, and at least one lock ramp on the outer face. The lock ramp includes a first end substantially flush with said outer face, a second end spaced circumferentially from said first end and axially outwardly from said face, an inclined surface extending from the first end to the second end, and an end surface at said second end extending out from said outer face. The second of the eyes includes a threaded second opening in axial alignment with the first opening. The shackle further includes a closure pin having a head portion, a radial flange, and a shank extending axially from the radial flange. The shank includes a threaded end portion opposite the flange. A releasable lock member is carried by the closure pin. The lock member includes at least one detent extending axially towards the threaded end of the shank. A spring biases the lock member endwise of the closure pin, towards the threaded end of the shank, to place the detent into a first position in which it extends axially beyond said radial flange. The releasable lock member is retractable against the force of the spring an amount sufficient to retract the detent into a second position in which it does not extend axially beyond the annular flange. In use, the closure pin is picked up and moved to insert the threaded end portion of the shank into and through the first opening and then across the throat to and into the second opening. The closure pin is then rotated to screw the threaded end portion of the shank into this threaded second opening. During such rotation the detent contacts the inclined surface of the look ramp and by such contact is retracted without disturbing the rotation. When the closure pin is connected to the clevis, a reverse rotation of the closure pin is prevented by contact of the detent with the end surface of the lock ramp. The closure pin can be removed from the clevis by retracting the lock member to retract the detent into its second position while rotating the closure pin in a reverse direction.

In preferred form, the annular flange includes a pair of outwardly opening radial slots, at diametrically opposite locations on the flange. The lock member includes two detents, one positioned in each slot. Also in preferred form, the clevis includes a plurality of lock ramps on the outer face of the first eye. The lock ramps are spaced circumferentially apart. Each lock ramp has a first end substantially flush with the outer surface, a second end spaced circumferentially from the first end and axially from said space, an inclined surface extending from the first end to the second end, and an end surface at the second end extending outwardly from the outer face.

Preferably, the lock member includes a central portion interconnecting the two detents. The head portion of the closure pin includes a through opening in which the central portion of the look member is received. The lock member includes a pair of side parts on opposite sides of the head portion. The head portion includes a through opening outwardly of the central portion of the look member. The spring is in the form of a leaf spring having a central portion located within the through opening, and opposite end portions in contact with the side portions of the lock member. The side portions of the lock member are configured to provide finger grips, whereby a user may grasp the finger grips with his or her fingers, and pull on the look member to retract the detents. Other features, objects and advantages of the invention are hereinafter described as a part of the description of the best mode of the invention.

BRIEF DESCRIPTION OF THE DRAWINGS

Like reference numerals are used to designate like parts throughout the several views of the drawing, and:

FIG. 1 is an exploded pictorial view of a shackle constituting a preferred embodiment of the invention, such view showing the lock pin portion of the shackle spaced from the clevis portion of the shackle, along a bent axis line, and further showing a lock member and a spring which are carried by the lock pin, spaced from the lock pin;

FIG. 2 is an elevational view of the shackle, showing the lock pin spaced endwise of its connected position with the clevis, and showing a portion of the clevis in section;

FIG. 3 is a fragmentary elevational view taken substantially along the aspect of line 3—3 of FIG. 2;

FIG. 4 is a sectional view taken substantially along line 4—4 of FIG. 3, such view including a phantom line showing of a detent that is the part of a look member that is carried by the lock pin;

FIG. 5 is a fragmentary view, partially in section, and partially in side elevation, in the head region of the lock pin; and FIG. 6 is a view like FIG. 5, taken from the aspect of lines 6—6 of FIG. 5;

FIG. 7 is a sectional view taken substantially along line 7—7 of FIG. 5;

FIG. 8 is an either side elevational view of the head portion of the closure pin; and FIG. 9 is a pictorial view of the look member.

BEST MODE FOR CARRYING OUT THE INVENTION

Referring to FIG. 1, the shackle of the present invention comprises only two separable components, a clevis 10 and a closure pin 12. The clevis 10 is a substantially U-shaped member having a closed end 14 and an open end defined by and between a pair of eyes 16, 18. The eyes 16, 18 are at the ends of a pair of arms 20, 22. At the closed end 14 of clevis 10 the arms 20, 22 are interconnected by a bight 24.

Eye 16 includes an opening 26 which is herein referred to as the first opening. Eye 16 also includes an outer face 28 on which is formed a plurality of ramps 30. Four ramps 30 are preferred, but the number of ramps 30 can vary. As best shown by FIG. 3, the ramps 30 are spaced apart circumferentially about the face 28. Each ramp 30 includes a first end 32 that is substantially flush with the outer face 28, a second end 34 which is spaced both circumferentially from said first end 32 and axially outwardly from the face 28, an inclined surface 36 which extends from first end 32 to the second end 34, and an end surface 38 at the second end 34 which extends out from the face 28. Preferably, end surface 38 extends perpendicular to the plain of the face 28, as shown by FIG. 4.

The second eye 18 is like the first eye 16, except that the ramps 30 are omitted and its central opening 40 is smaller than opening 26 and it is threaded whereas opening 26 is not. Openings 26 and 40 are in coaxial alignment.

The closure pin 12 has a head portion 42 at one end and a threaded portion 44 at the opposite end. Threaded portion 44 is a part of a shank 46 which extends axially from a radial flange 48. Flange 48 is positioned axially between head portion 42 and shank 46. In Preferred form, flange 48 includes a pair of outwardly opening radial slots 50, 52 (FIGS. 1 and 7). The slots 50, 52 are located at diametrically opposed locations on the flange 48. The slots 50, 52 receive a pair of detents 54, 56 which are a part of a lock member 58. Detents 54, 56 are interconnected by a central portion 60 of the looking member 58. The head portion 42 of closure pin 12 includes a through opening 62 in which the central portion 60 of lock member 58 is situated. Head portion 42 includes a slot 64 endwise outwardly of the central portion 60 of lock member 58. The slot 64 is wider than the look member 58 is thick. The central portion 66 of a leaf spring 68 is positioned within the slot 64. A pair of confronting shoulders (FIG. 6) prevent movement of the spring 68 away from the lock member 58.

As best shown by FIGS. and 5, the lock member 58 includes a pair of side portions 74, 76 situated on opposite sides of head portion 42. The opposite ends 78, 80 of leaf spring 68 make contact with the side portions 74, 76. When the leaf spring 68 is installed, it assumes a bent condition and it normally biases the lock member 58 towards the flange 48. The central portion 60 of the lock member 58 contacts the flange at a location between the two slots 50, 52. The detents 54, 56 extend into the slots 50, 52 and at the opposite end of flange 48 extend axially beyond the end surface 82 of flange 48. This is best shown by FIGS. 2 and 6. Preferably, the end 84, 86 of each detent 54, 56 is sloped at a slope which may matches the slope of the inclined surfaces 36. The sloped end surfaces 84, 86 of the detents 54, 56 are directed towards the inclined surfaces 36. Each detent 54, 56 includes a trailing portion having a rear edge 88, 90 that extends substantially perpendicular to both the flange 48 and the outer face 28 of eye 16.

The closure pin 12 and the clevis pin are connected in the following manner. The closure pin 12 is picked-up and its threaded end portion 44 is moved through opening 26, across the throat of the clevis 10, and into threaded opening 40. Closure pin 12 is then rotated in the clockwise direction. This rotation screws the threads 44 into the threads 40 and moves the closure pin 12 axially through the two aligned openings 26, 40. Eventually, the sloped ends 84, 86 of the detents 54, 56 will contact the inclined surfaces 36 of the ramps 30. When this happens, the contact will move the detents 54, 56, and the lock member 58 of which they are a part, endwise of the closure pin 12, towards the head end portion 42. The detents 54, 56 will move relatively up the ramps 36, and in the process will retract against the force of the spring 68. As rotation continues, the detents 54, 56 will drop off the second ends 34 of the ramps 30 and be moved by the spring 68 against the flange 48. This action will continue until the threads 44 of closure pin 12 are well into the threads 40 of eye 18 and the end surface 82 of flange 48 is in contact with the second ends 34 of the ramps 30. At this time the closure pin 12 is connected to the clevis 10. Unwanted reverse rotation of the closure pin 12, caused by vibration forces, or other forces encountered by the shackle, will be prevented by contact which occurs between the edge surfaces 88, 90 of the detents 54, 56 and the end surfaces 38 of the ramps 30. This contact is clearly shown in FIG. 6.

The closure pin 12 is disconnected from 10 very easily, in the following manner. The user grasps the side portions 74, 76 of the lock member and pulls on them to move the lock member 58 against the force of the spring 68. This retracts lock member 58 into a position in which the detents 54, 56 are within the slots 50, 52 and no longer extend beyond the surface 82 of flange 48. The look member 58 is held in a retracted position while the closure pin 12 is rotated in a counterclockwise or reverse direction. As soon as rotation moves the flange 48 away from the ends 36 of the ramps 30 a distance greater than the extension distance that the detents 54, 56 when he central portion 60 of lock member 58 is in contact with the flange 48, the reverse rotation can be continued without it being necessary to pull on the lock member 58. The reverse rotation is continued until the threaded end portion 44 of closure pin 12 has been unscrewed from the threaded opening 40. When the threads 44, 40 separate, the closure pin 12 is then moved endwise outwardly from the aligned openings 26, 40.

As will be readily appreciated, the lock member 58 and the leaf spring are firmly secured to the closure pin 12. They are separate parts but when incorporated into the closure pin they are not readily separable from it. Accordingly, the addition of the pin lock mechanism to the shackle does not add any additional separable parts to the shackle. The shackle essentially includes only two components, the clevis 10 and the closure pin 12, the same as it would if it did not include a closure pin look mechanism.

The scope of protection is not to be limited by the details of the preferred embodiment, or best mode, which have been illustrated and described. Rather, the extent of protection is to be determined by the appended claims, interpreted in accordance with the established rules of patent claim interpretation, including use of the doctrine of equivalents.

What is claimed is:

1. A shackle, comprising:

a substantially U-shaped clevis having a closed end and an open end, a pair of spaced apart eyes at the open end defining a throat between them, one of said eyes including a first opening, an outer face, and a plurality of lock ramps on the outer face, said lock ramps being spaced circumferentially apart, and each lock ramp having a first end substantially flush with said outer surface, a second end spaced circumferentially from said first end and axially from said face, an inclined surface extending from the first end to the second end, and an end surface at said second end extending substantially outwardly from said outer face and the second of said eyes including a threaded second opening in axial alignment with the first opening;

a closure pin comprising a head portion, a radial flange, and a shank extending axially from the radial flange, said shank including a threaded end portion opposite said flange;

a releasable lock member carried by said closure pin, including a plurality of detents, each extending axially towards the threaded end of the shank, each said detent having a first position in which it extends axially beyond said radial flange, and a second position in which it does not extend axially beyond said radial flange; and a spring biasing the lock member endwise of the closure pin, towards the threaded end of the shank, to place each detent into its first position, said releasable lock member being retractable against the force of the spring an amount sufficient to retract each detent into its second position, wherein in use the closure pin is picked-up and moved to insert the threaded end portion of the shank into and through the first opening, across the throat, to and into the second opening, and is then rotated to screw the threaded end portion of the shank into the threaded second opening, wherein during such rotation the detents contact the inclined surfaces of the lock ramps and by such contact are retracted, wherein when the closure pin is connected to the clevis a reverse rotation of the closure pin is prevented by contact of the detent with end surfaces of the lock ramps, and wherein the closure pin is removed from the clevis by retracting the lock member to retract the detents into said second position while rotating the closure pin in a reverse direction.

2. A shackle according to claim 1, wherein said radial flange includes a pair of outwardly opening radial slots, at diametrically opposite locations on the flange, and said lock member includes two detents, one positioned in each slot.

3. A shackle according to claim 2, wherein said lock member includes a central portion interconnecting the two detents, and the head portion of the closure pin includes a through opening in which the central portion of the lock member is received.

4. A shackle according to claim 3, wherein said lock member includes first and second side portions on opposite sides of the head portion, said head portion includes a through slot, and said spring is a leaf spring having a central portion within said slot and opposite end portions which engage the side portions of the lock member.

5. A shackle according to claim 4, wherein said side portions of the lock member together form a finger grip engageable by fingers of a user, to be used for retracting the lock member against the force of the spring.

6. A shackle, comprising:

a substantially U-shaped clevis having a closed end and an open end, a pair of spaced apart eyes at the open end defining a throat between them, one of said eyes including a first opening, an outer face, and at least one lock ramp on said outer face, said lock ramp having a first end substantially flush with said outer face, a second end spaced both circumferentially from said first end and axially outwardly from said face, an inclined surface extending from the first end to the second end, and an end surface at said second end extending out from said outer face, and the second of said eyes including a threaded second opening in axial alignment with the first opening;

a closure pin comprising a head portion, a radial flange, and a shank extending axially from the radial flange, said shank including a threaded end portion opposite said flange;

a releasable lock member carried by said closure pin, including two detents extending axially towards the threaded end of the shank;

a spring biasing the lock member endwise of the closure pin, towards the threaded end of the shank, to place the detents into a first position in which they extend axially beyond said radial flange, said releasable lock member being retractable against the force of the spring an amount sufficient to retract the detent into a second position in which they do not extend axially beyond said radial flange;

wherein in use the closure pin is picked-up and moved to insert the threaded end portion of the shank into and through the first opening, across the throat, to and into the second opening, and is then rotated to screw the threaded end portion of the shank into the threaded second opening, wherein during such rotation the detents contact the inclined surface of the lock ramp and each by such contact is retracted, wherein when the closure pin is connected to the clevis a reverse rotation of the closure pin is prevented by contact of a said detent with the end surface of the lock ramp, and wherein the closure pin is removed from the clevis by first retracting the lock member to retract the detents into its second position and holding them in said second position while rotating the closure pin in a reverse direction; and wherein the radial flange includes a pair of outwardly opening radial slots, at diametrically opposite locations on the flange, and one of said detents is positioned in each slot.

7. A shackle according to claim 6, wherein said lock member includes a central portion interconnecting the two detents, and the head portion of the closure pin includes a through opening in which the central portion of the lock member is received.

8. A shackle according to claim 7, wherein said lock member includes first and second side portions on opposite sides of the head portion, said head portion includes a through slot, and said spring is a leaf spring having a central portion within said slot and opposite end portions which engage the side portions of the lock member.

9. A shackle according to claim 8, wherein said side portions of the lock member together form a finger grip engageable by fingers of a user, to be used for retracting the lock member against the force of the spring.

10. For use with a substantially U-shaped clevis having a pair of spaced apart eyes including aligned openings, one of which is threaded, a closure pin, comprising a head portion, a radial flange connected to the head portion, an elongated shank connected to the radial flange and extending axially from the radial flange, said shank including a threaded free end portion;

said radial flange including at least two outwardly opening radial slots;

a releasable lock member carried by said closure pin, said lock member including two axially extending detents, each positioned in a said radial slot;

a spring carried by the closure pin, normally biasing the lock member endwise of the closure pin, towards the threaded end of the shank, to place the detents into a first position in which they extend axially beyond said radial flange, said releasable lock member being retractable against the force of the spring an amount sufficient to retract the detents into a second position in which they do not extend axially beyond said radial flange; and wherein each said radial slot in the radial flange is at a location diametrically opposite the other radial slot.

11. A closure pin according to claim 10, wherein the lock member includes a central portion interconnecting the two detents, and the head portion of the closure pin includes a through opening in which the central portion of the lock member is received.

12. A closure pin according to claim 11, wherein said head portion includes a through slot, and said spring is a leaf spring having a central portion within said slot, said leaf spring also including opposite end portions which engage the lock member on opposite sides of the head portion.

13. A shackle, comprising:

a substantially U-shaped clevis having a closed end and an open end, a pair of spaced apart eyes at the open end defining a throat between them, one of said eyes including a first opening, an outer face, and a plurality of lock ramps on said outer face, each said lock ramp having a first end substantially flush with said outer face, a second end spaced both circumferentially from said first end and axially outwardly from said face, an inclined surface extending from the first end to the second end, and an end surface at said second end extending out from said outer face, and the second of said eyes including a threaded second opening in axial alignment with the first opening;

a closure pin comprising a head portion and a shank extending axially from said head portion, said shank including a threaded end portion opposite said head portion;

a releasable lock member carried by said closure pin and including a plurality of detents, each extending axially towards the threaded end of the shank, and a pull portion; and a spring biasing said lock member axially endwise of the closure pin, towards the threaded end of the shank, to place the detents into an extended first position, said lock member being movable axially against said spring by a pull on said pull portion to move the detents into a retracted second position, wherein in use the closure pin is picked-up and moved to insert the threaded end portion of the shank into and through the first opening, across the throat, to and into the second opening, and is then rotated to screw the threaded end portion of the shank into the threaded second opening, wherein during such rotation the detents contact the inclined surfaces of the lock ramps and each by such contact is retracted, wherein when the closure pin is connected to the clevis a reverse rotation of the closure pin is prevented by contact of the detents with the end surface of the lock ramp, and wherein the closure pin is removed from the clevis by first pulling on said pull portion of the lock member to retract the detents into their second position and holding them in said second position while rotating the closure pin in a reverse direction.

14. The shackle of claim 13, wherein each said detent has an end portion including a sloped surface which leads when the pin is rotated to thread its threaded end portion into the threaded second opening.

15. The shackle of claim 13, wherein said lock member includes a central portion interconnecting said detents, and the head portion of said closure pin includes a cavity which receives the central portion of said lock member.

* * * * *